United States Patent [19]

Soref

[11] Patent Number: 4,948,229
[45] Date of Patent: Aug. 14, 1990

[54] OPTICAL SWITCHES USING FERROELECTRIC LIQUID CRYSTALS

[75] Inventor: Richard A. Soref, Newton Centre, Mass.

[73] Assignee: The United States of America as represented by the Secretary of the Air Force, Washington, D.C.

[21] Appl. No.: 311,016

[22] Filed: Feb. 15, 1989

Related U.S. Application Data

[63] Continuation-in-part of Ser. No. 169,910, Mar. 18, 1988.

[51] Int. Cl.[5] .............................................. G02R 6/32
[52] U.S. Cl. ............................... 350/96.18; 350/96.14; 350/96.15
[58] Field of Search ................. 350/96.14, 96.15, 96.18

[56] References Cited

U.S. PATENT DOCUMENTS

| | | | |
|---|---|---|---|
| 4,269,511 | 5/1981 | Erwin | 356/368 |
| 4,278,327 | 7/1981 | McMahon et al. | 350/96.14 |
| 4,478,494 | 10/1984 | Soref | 350/381 |
| 4,556,727 | 12/1985 | Walba | 560/73 |
| 4,708,439 | 11/1987 | Ishii et al. | 350/331 R |
| 4,720,171 | 1/1988 | Baker | 350/331 R |

*Primary Examiner*—William L. Sikes
*Assistant Examiner*—Robert E. Wise
*Attorney, Agent, or Firm*—Jacob N. Erlich; Donald J. Singer

[57] ABSTRACT

This invention comprises a new group of fiber optic switching devices that use layers of surface-established ferroelectric liquid crystals (FLCs) as the switching media. In each of the devices light impinges upon the ferroelectric liquid crystal a an angle of 90 degrees (normal incidence) with the surface plane. Each FLC gives 0 degrees or 90 degree optical rotation, depending upon the polarity of the electric voltage applied. A series of polarizing beam splitters are used to separate unpolarized light into its s and P polarization components. After ferroelectric liquid crystal switching, other polarizing beam splitters are used to direct the s and p light to output optical paths. The switches discussed include voltage controlled 2×2, 1×4, 1×6, 1×8, 4×4 and dual plane devices that use one or more layers of surface stabilized ferroelectric liquid crystals to direct optical signals.

11 Claims, 8 Drawing Sheets

OPTICAL SWITCHES USING FERROELECTRIC LIQUID CRYSTALS

RELATED APPLICATIONS

This is a Continuation-in-Part of Application serial number 169,910 filed Mar. 18, 1988 and entitled "Normal Incidence Optical Switches using Ferroelectric Liquid Crystals."

TECHNICAL FIELD

This invention relates to optical switches and is particularly related to fast acting compact optical switches for communications and other fields.

BACKGROUND OF THE INVENTION

A variety of fiber optic switches have been produced or proposed primarily for optical communications. These switches rely on conventional nematic liquid crystals. While these conventional devices are have permitted successful optical switching they have some significant drawbacks.

The most serious problem with conventional optical switches is that they are relatively slow. While optical communications networks would appear to have great advantages over electronic networks, the conventional nematic switches can only operate in the range of 1-100 milliseconds which limits network speed.

Another problem with conventional optical switches is a lack of memory and numerous stability states. Unpowered nematic type switches may quickly become disordered and thus fail to direct optical signals according to the most recently selected path. In other words, such conventional switches do not have a memory and if left unpowered may give haphazard and undesired results.

In view of the above, a need exists for fast acting optical switches that will allow increased operating speeds in fiber optic networks.

A further need exists for compact optical switches that allow further miniaturization of optical components.

Yet another needs exits for stable optical switches that continue to direct optical signals along preselected paths after removal of activating signals.

SUMMARY OF THE INVENTION

The invention comprises an optical switch wherein an input optical fiber directs light onto a first polarization means that polarizes the incoming light and directs it to a ferroelectric liquid crystal (FLC) which is preferably a smectic phase liquid crystal. In the preferred embodiment of the invention, the ferroelectric liquid crystal receives the polarized light at normal incidence and selectively changes the polarization state of the light received. A second polarization means receives the light from the ferroelectric liquid crystal and directs it to output optic fibers according to its polarization state. Control of the ferroelectric liquid crystal allows preselection of the polarization state of the output light which is thereby directed to a particular output path according to its polarization state.

In a preferred embodiment of the invention the second polarization means comprises a polarizing beam splitter that selectively directs the light from the ferroelectric liquid crystal (FLC) amongst output optic fibers.

In the preferred embodiment of the invention, the FLC further comprises electrodes for changing the optical rotary power of the crystal in order to select the output polarization state of the optic signals. Further, the FLC selectively rotates polarized light between the s and p states and is bi-stable. Specifically, the bi-stable crystal will continue to rotate light according to a previous selection until the electrodes are activated to change the selection.

Another aspect of a preferred embodiment of the invention comprises the use of input optic fibers having a collimating lens for collimating light directed into the FLC. Further, output optic fibers are provided with a lens for focusing the collimated light, from the FLC, onto the core of the selected output fiber.

A preferred embodiment of the optical switch comprises a 4×4 non-blocking switch. This 4×4 non-blocking switch comprises a polarizer for the four input optical paths, a first liquid crystal cell comprising four addressable pixels, a first light directing layer comprising polarizing beam splitters and right angle mirrors for directing optical signals according to their polarization, a second liquid crystal cell comprising eight addressable pixels, a second light directing layer comprising right angle mirrors and polarizing beam splitters and a third liquid crystal cell comprising eight addressable pixels for selectively changing optical signal polarization. A final light directing region comprising a polarizing beam splitter and a right angle mirror directs the optical signals according to their polarization and pre-directed paths into any of 4 output optical paths irrespective of which of the 4 input paths was originally selected.

In yet another preferred embodiment of the invention, the optical switch comprises two switch planes each of which has an input fiber, an output fiber, a first and second polarizing beam splitter as well as a ferroelectric crystal pixel for selectively rotating polarized light between the "s" and "p" states. In this device a dual right angle prism is oriented perpendicular to the parallel switch planes and serves to transfer optical signals between the switch planes.

It is therefore an object of this invention to provide a ferroelectric liquid crystal (FLC) optical switch for processing optical signals.

It is an advantage of this invention to provide an optical switch with a greatly increased operating speed.

It is further object of this invention to provide a compact optical switch which is advantageous for miniaturizing optical circuitry.

Yet another object of this invention is to provide an optical switch having a memory capability such that optical signals will be directed along a preselected path until switch position is actively changed.

BRIEF DESCRIPTION OF THE DRAWINGS

The foregoing and other objects and advantages of the invention will be apparent from the following more particular description of the preferred embodiments of the invention, as illustrated in the accompanying drawings, in which like reference characters refer to the same parts throughout the different views. The drawings are not necessarily to scale, emphasis instead being placed upon illustrating the principles of the invention.

DETAILED DESCRIPTION OF THE INVENTION

This invention comprises a new group of fiber optic switching devices that use layers of surface-stabilized ferroelectric liquid crystals (FLCs) as the switching media. In each of the devices light impinges upon the ferroelectric liquid crystal at an angle of 90 degrees with the surface plane, more simply stated, light is always normally incident upon the FLC. Each FLC gives 0 degree or 90 degree optical rotation, depending upon the polarity of the electric voltage applied. A series of polarizing beam splitters are used to separate unpolarized light into its s and p polarization components. After ferroelectric liquid crystal switching, other polarizing beam splitters are used to direct the s and p light to output optical paths. The switches discussed below are voltage controlled 2×2, 1×4, 1×6, 1×8, 4×4, or N×N devices that use one or more layers of surface stabilized ferroelectric liquid crystals (i.e., smectic phase liquid crystal elements).

These ferroelectric liquid crystal switches are practical and efficient devices for routing optical signals among single mode fibers or among multi-mode fiber transmission lines. All the switches described below are simple to construct, easy to manufacture and low in cost. The smectic phase liquid crystal elements used in these switches offer a 1 to 10 microsecond switching time, 15 volt operation, a wide wavelength-range, polarization independence (if desired), low insertion loss, bi-stable or monostable operation, low optical crosstalk, and low power consumption. A variety of switches are shown and will be described with reference to the drawings. The different but related switching structures can use one or several ferroelectric liquid crystal (FLC) layers.

Manufacture of ferroelectric liquid crystal layers of the type used herein has been demonstrated by Displaytech Inc. of 2200 Central Ave., Boulder, Colo. 80301, and has been disclosed in their patents and publications. The ferroelectric liquid crystal layers of Displaytech are, in this invention, combined with polarizing beam splitters to produce compact normal incident switches. Polarizing beam splitters are well-known and are made by depositing a multi-layer dielectric stack on the hypotenuse of a glass cube. Polarizing beam splitters separate unpolarized light into s and p components that travel in paths separated by a 90 degree angle.

Figure 7:
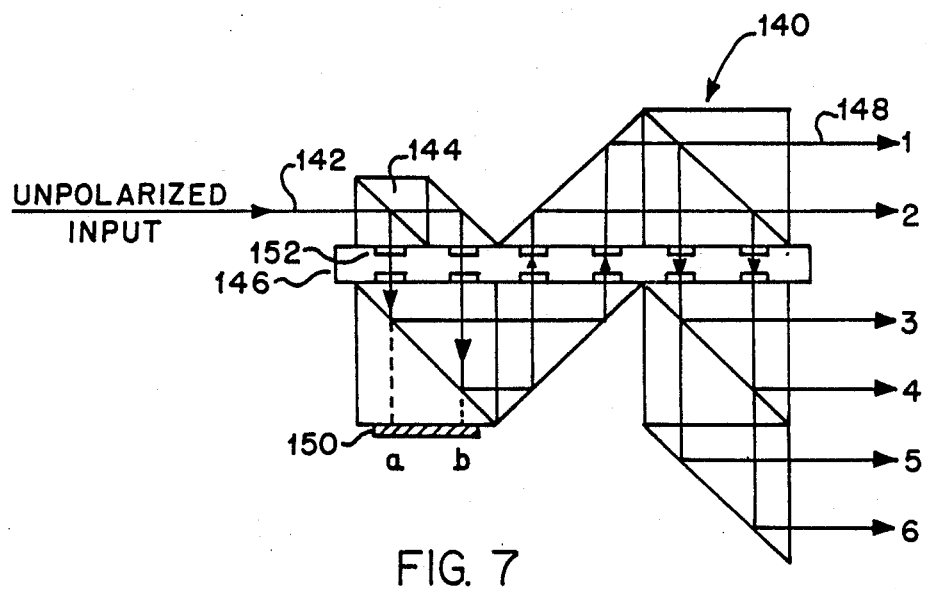
FIG. 7 is a schematic representation of a compact 1×6 optical switch using a single FLC layer.

As will be shown below, this invention allows monolithic stacking of switches, side-by-side. This is done by physically extending the polarizing beam splitters in the z direction (the polarizing beam splitters segregate light in the x and y directions). Generally, an optical cascade of polarizing beam splitters and active ferroelectric liquid crystals are used to form complex switches. In some switches, light makes multiple passes through one FLC while in others, there are multiple FLC panels and multiple polarizing beam splitters. To make a switch with −40 dB of optical crosstalk, four switches with −20 dB each of optical crosstalks are cascaded; this results in a compound (complex) switch. Also taught is how to construct a 4×4 nonblocking matrix switch. This switch is shown in FIG. 7 and discussed below. One can construct switches that do, or do not require optically polarized input and/or produce a polarized output. Polarizing switches have the drawback that their thru-put loss is more than 3 dB, assuming unpolarized input light, however, these switches are simple to manufacture and operate. Polarization-independent switches have a loss of only about 1 dB for any fiber. These switches, however, are more complex because the input light is first split (polarized) and then recombined.

A detailed but generally applicable description of a typical switch is given below, followed by a short description of each additional preferred switch embodiment. Referring to the cross-sectional view of the compact 1×4 optical switch shown in FIG. 1, the optical switch 10 is typically connected to an input optic fiber 12 which includes a lens 14. The lens 14 is typically a grinrod lens that is provided to collimate light from the optic fiber into the switch structure. At each output optic fiber 16 another lens 18 is provided to refocus the collimated light from the switch onto the core of the output fiber. The smaller the input core, the better the collimation.

Unpolarized light from input optic fiber 12 is collimated and transmitted to beam splitter 30, where either s or p light, depending on beam splitter configuration, is transmitted to a light absorber 32. The remaining polarized (s or p) light is reflected to the ferroelectric liquid crystal (FLC) layer 20 at control area (FLC pixel) 26. The light signal passing through the FLC is either transmitted through unchanged or has its polarization state rotated 90 degrees. The optical polarization is at 0 degrees or at a 45 degree angle with respect to the optic axis of the ferroelectric crystal pixel, as described in Displaytech publications. The ferroelectric liquid crystal is manufactured with a 22 degree tilt angle, a specific birefringence for the liquid and a specific plate spacing. Thus the optical rotary power of the ferroelectric liquid crystal pixel is designed to be either 0 degrees or 90 degrees, depending upon drive voltage. As a result, s and p polarized light either passes through unchanged, or s state is changed to p state light and p state is changed to s state light. The 0 degree or 90 degree transformation is chosen for optical switching because output polarizing beam splitters send s and p polarized light in different directions. Switches can also be designed to recombine s and p light at a preferred output fiber in order to simulate an unpolarized switch.

Figure 1:
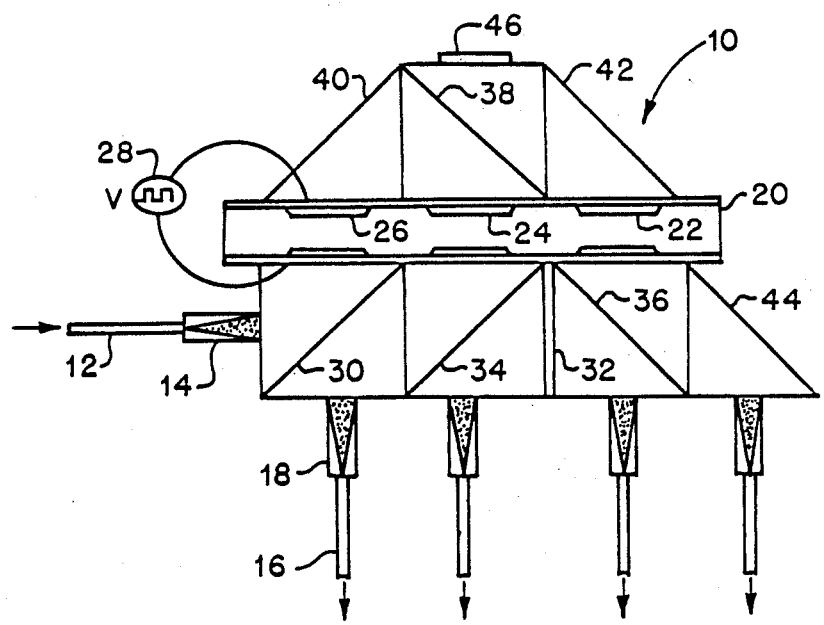
FIG. 1 is a schematic cross-sectional representation of a compact multi-way 1×4 electro-optical liquid crystal switch; incorporating the principles of this invention.
Figure 2:
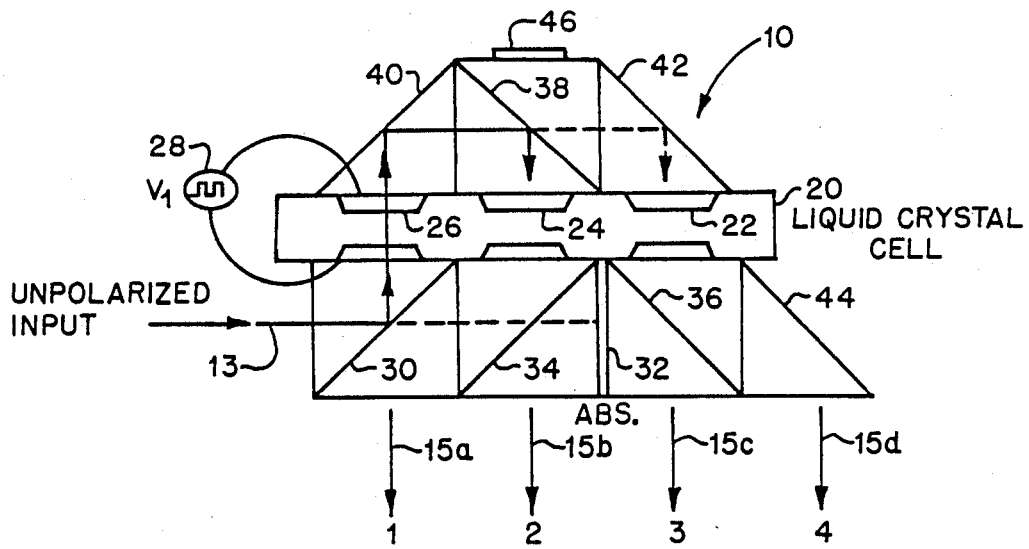
FIG. 2 is a schematic representation of the compact 1×4 optical switch of FIG. 1 with a diagramatic representation of optical signal routing through the switch.
Figure 3A:
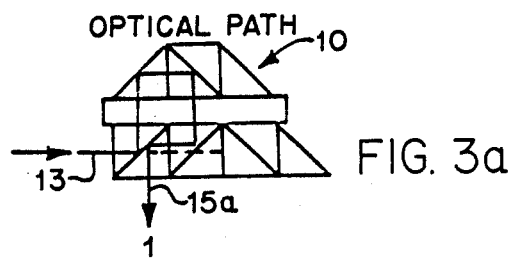
FIGS. 3A through 3D are schematic representations of optical switching through the optical switch of FIG. 1.
Figure 3B:
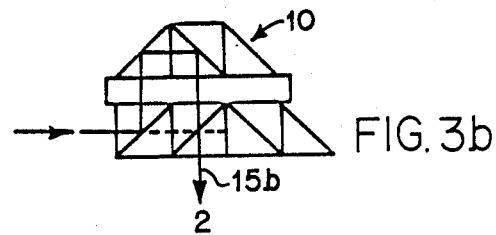
Figure 3C:
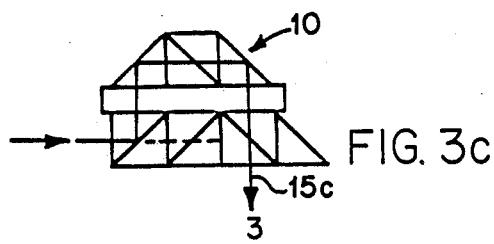
Figure 3D:
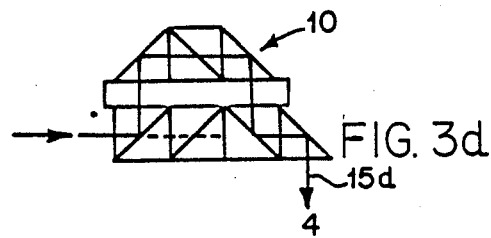

FIG. 2 is a schematic representation showing optical paths through the compact 1×4 optical switch of figure 1. An input optical signal (unpolarized) 13 enters switch 10 and is both transmitted and reflected by the first polarizing beam splitter 30. Thus the polarizing beam splitter 30 separates the light into its polarized optical components (s and p) one of which is absorbed (32) while the other s transmitted through FLC 20. This signal either remains unchanged or has its polarization state changed by first addressable FLC area 26. The signal is then reflected by 45 degree mirror (right angle prism) 40 into the second polarizing beam splitter 38. Depending upon the polarization state of the signal at beam splitter 38, the light is either reflected directly back into the FLC at addressable area 24 or is transmitted to 45 degree mirror 42 and sent to addressable area 22. The signal sent through FLC area 24 is either transmitted or reflected by polarizing beam splitter 34 depending on the rotary polarizing operation of the FLC. If reflected, the light is sent back into polarizing beam splitter 30 and out in the first output 15a (See FIG. 3A). If transmitted, (through polarizing beam splitter 34) the light exits the switch at second output 15b (FIG. 3B). If, however, light has been transmitted through polarizing beam splitter 38 and traverses the FLC at area 22, the light is directed by polarizing beam splitter 36 either into the third output 15c (FIG. 3C) or to the fourth output 15d (FIG. 3D). The 45 degree mirror 44 is used for directing optic signals into the fourth output fiber 15d and a light absorber 46 absorbs inadvertently reflected or transmitted light.

Figure 4:
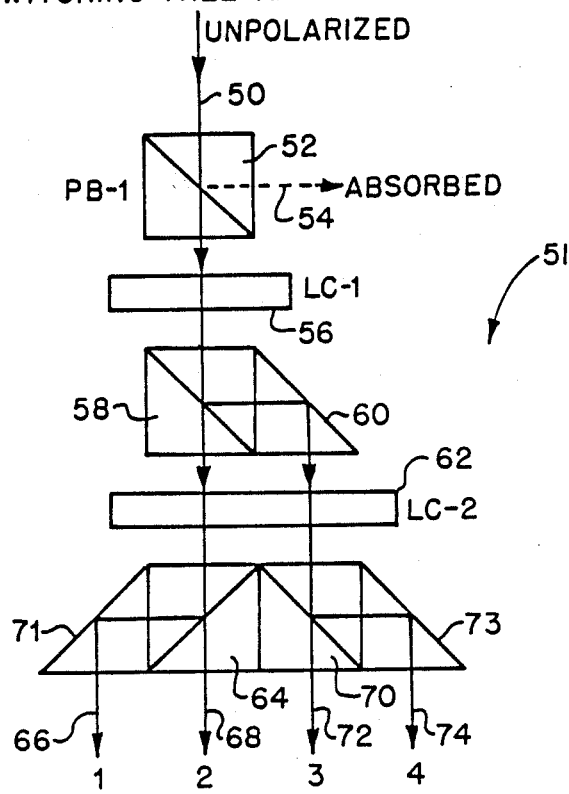
FIG. 4 is a schematic exploded representation of an alternate multi-way 1×4 electro-optical liquid crystal switch which also incorporates the principles of this invention.

A simple multi-way 1×4 electro-optical liquid crystal switch based on a switching tree approach is shown in exploded schematic form in FIG. 4. Light from an input fiber 50 enters a polarizing beam splitter 52. The polarizing beam splitter reflects light of one polarized state (p or s) which is absorbed (54), and transmits polarized light of a second polarized state (s or p) to a first ferroelectric liquid crystal (FLC) 56. Depending upon the selected rotary optical power ( 0 degrees or 90 degrees) of FLC 56, the polarized light leaving the liquid crystal is either reflected or transmitted by a second polarizing beam splitter 58. If reflected, the polarized light enters a diagonal reflecting mirror 60 and is directed to the right side of a second FLC 62. If transmitted directly through polarizing beam splitter 58 the light enters the left side of the FLC 62. The output path (66, 68, 72, 74) of the light signal directed to the second FLC 62 is determined by changing or leaving unchanged the polarization state of the optic signal. Light leaving the left side of FLC 62 is directed to polarizing beam splitter 64 where the light is either reflected though a diagonal mirror into first output port 66 or transmitted directly through the beam splitter into second output port 68.

If the light signal was reflected by second polarizing beam splitter 58 and directed into the right side of FLC 62 it enters output beam splitter 70. Light transmitted through output beam splitter 70 is directed to the third output port 72 while light reflected by output beam splitter 70 is reflected by diagonal mirror 73 into the fourth output port 74.

Figure 5:
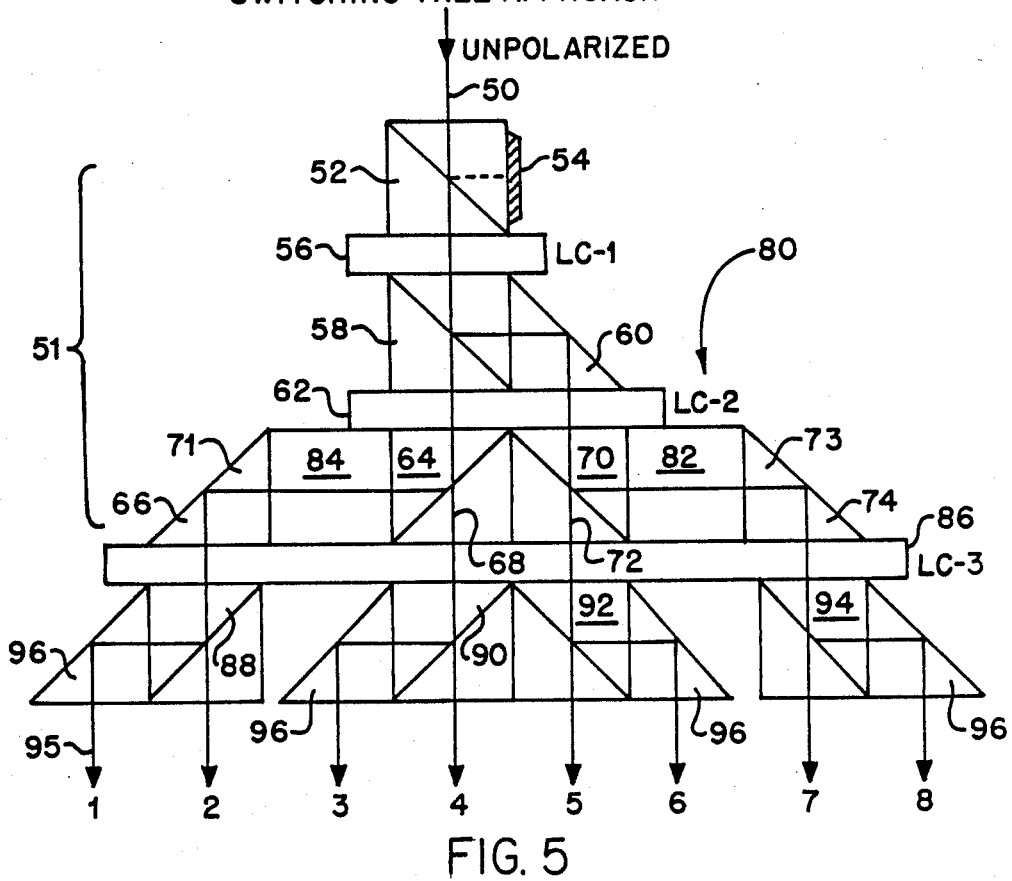
FIG. 5 is a schematic representation of a multi-way 1×8 electro-optical liquid crystal switch.

A more complex 1×8 multi-way electro-optical FLC switch 80 based on the switching tree approach, is shown in schematic form in FIG. 5. Switch 80 incorporates the 1×4 multi-way switch 51, previously discussed, and identical reference numerals are used for repeated components. Light 50 enters the 1×8 switch 80 from input fiber 50 and is directed into one of four intermediate output paths 66, 68, 72 and 74 which correspond to the output paths of switch 51. Spacers 82 and 84 have been added to spread out the adjacent output paths. An additional FLC 86 is used in switch 80 to act upon light passing through the preselected intermediate output paths 66, 68, 72 and 74. Light is thereby directed into one of the final output beam splitters 88, 90, 92, and 94 which direct light into one of eight output fibers 95 which have been numbered 1 through 8. Four 45 degree diagonal mirrors 96 are used in conjunction with the polarizing beam splitters to direct the optical signals to preselected output fibers 95.

Figure 6:
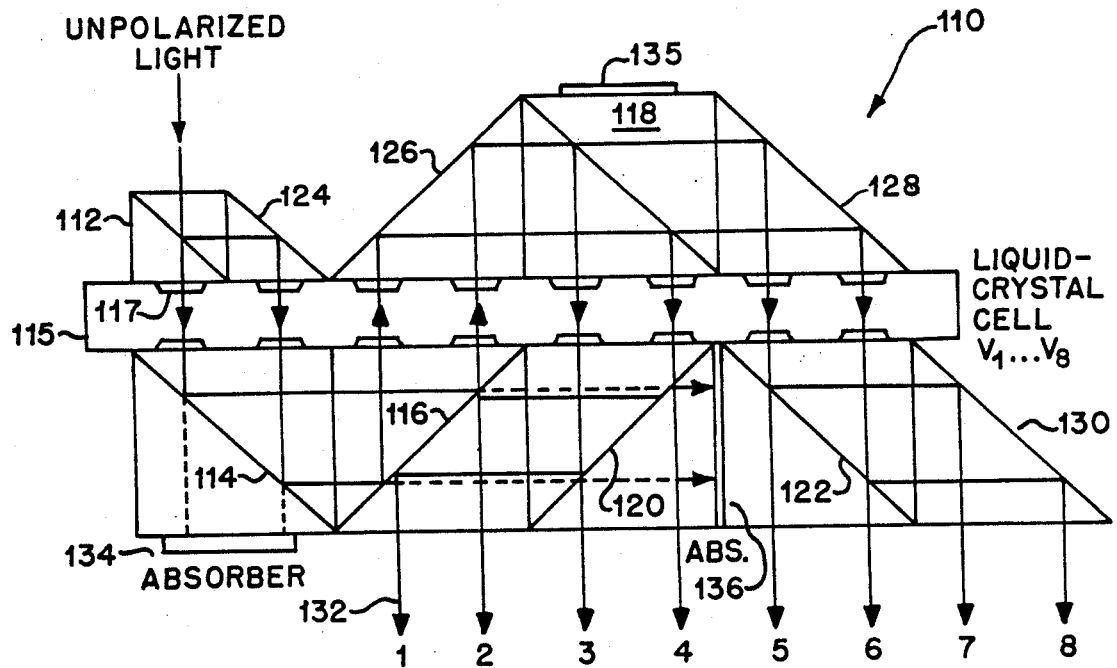
FIG. 6 is a schematic representation of a compact 1×8 optical switch using a single FLC layer.

FIG. 6 is a schematic representation of a compact 1×8 optical switch 110 using only a single FLC. The switch 110 makes use of an FLC 115 having eight addressable pixels 117. Polarizing beam splitters 112, 114, 116, 118, 120 and 122 are used to discriminate between the polarized light signals transmitted multiple times across the FLC. Mirrors (45 degrees) are used to direct the signal back and forth across the FLC and into one of the eight output optic fibers 132. The 45 degree mirrors are numbered 124, 126, 128 and 130. Undesired polarized light is absorbed at absorbers 134, 135 and 136. The switch is operated in a manner almost identical to that discussed with reference to FIG. 4.

FIG. 7 is a schematic representation of compact 1×6 optical switch using only a single FLC. Once again a component of the unpolarized input signal 142 is divided by a polarizing beam splitter 144 and directed through a series of 45 degree mirrors and polarizing beam splitters and makes multiple passes through FLC 146. The optical signal is ultimately directed to a preselected output fiber 148. In this particular device either s or p component may be selected for ultimate transmission depending upon the output desired. Unused portions of the input signal are absorbed by absorber 150. The FLC layer 146 comprises six individually addressable pixels 152 which can be controlled by a voltage source to cause either 90 degree rotation or 0 degree rotation of the optical signal's polarization.

Figure 8:
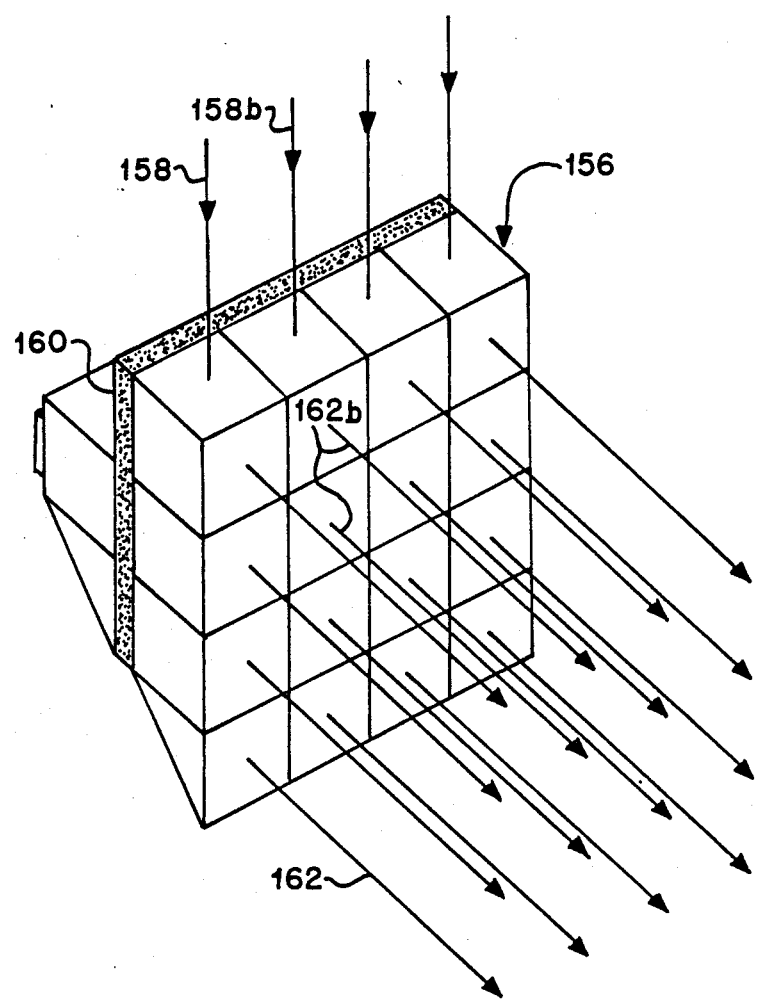
FIG. 8 is a perspective representation of an optical switching device comprising four 1×4 optical switches of the type described with reference to FIGS. 1–3.

FIG. 8 is a perspective representation of four independent 1×4 optical switches (of FIG. 1) stacked in parallel planes and controlled by a single FLC layer 160. The combined switch 156 has multiple inputs 158, all of which are directed through FLC 160. Any of the inputs can be sent to any of the outputs 162 in the same switch plane as the input (for example, 158b to 162b).

Figure 9:
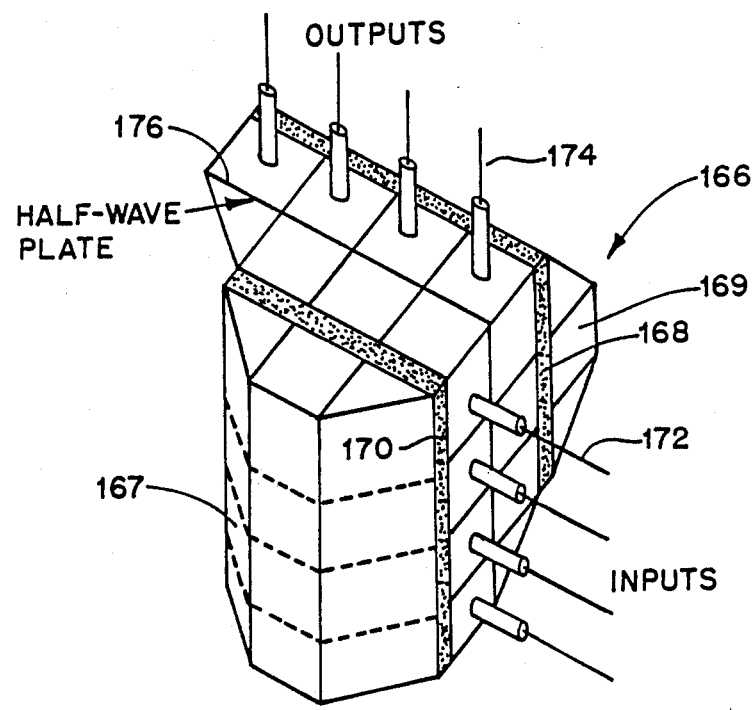
FIG. 9 is a perspective representation of a 4×4 optical signal exchange controlled by two FLC layers.

FIG. 9 is a perspective representation of a 4×4 optical switch 166 having two FLC layers. In this 4×4 switch a first quartet of 1×4 switches 167 has been cascaded with a second quartet of 1×4 switches 169 in order to form a 4×4 nonblocking matrix switch. Each quartet or module, is equivalent to the 1×4 switch of FIG. 8 and shares a FLC panel (168 or 170). In this nonblocking switch any of the inputs 172 may be directed to any of the outputs 174. Half-wave plates 176 are interposed between the two switch modules in order to selectively rotate by 90 degrees the polarization of the light passing therebetween. The half-wave plates are used selectively so that the polarization of the light passing to the second module 169 is compatible with what it can accept. Specifically, the half-wave plates are used at the four corners and at the four most central areas where light is passed between the modules.

Figure 10:
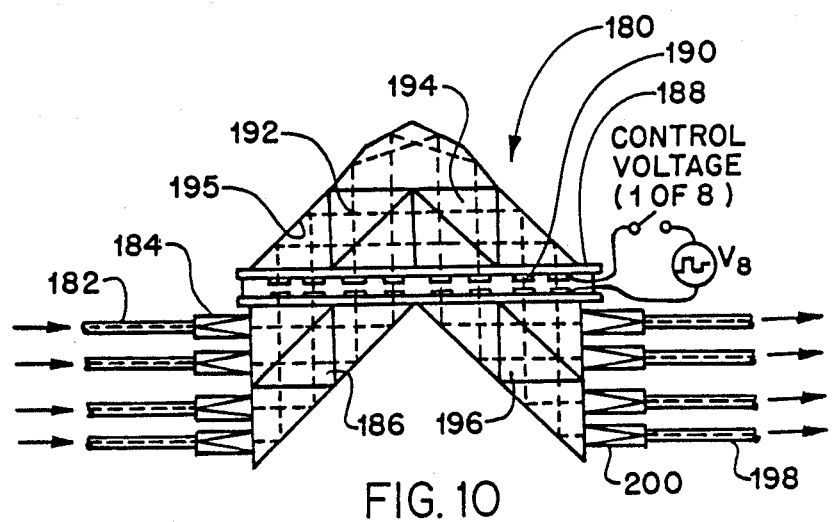
FIG. 10 is a schematic representation of a planar 4×4 optical matrix switch activated by a single FLC layer with eight addressable regions.

FIG. 10 is a schematic representation of a polarization independent planar 4×4 optical matrix switch 180, actuated by a single FLC layer 188 with eight addressable areas (pixels) 190, which can achieve 16 out of 24 possible distinct states. This switch 180 has four input optic fibers 182 having four collimating lenses 184. Optical signals entering switch 180 are separated into s and p portions by polarizing beam splitter 186. These polarized portions of the signal are rotated 90 degrees or 0 degrees depending on the output selection in the particular addressable area 190. Use of beam splitters 192, 194 and 196 and internal mirrored structure surfaces 195 permit direction of both portions of the polarized light to a particular output fiber 198 and their recombination at an output focusing lens 200. Thus, the 4×4 optical matrix switch 180 can be used to deliver a nonpolarized optical signal between one of the inputs 182 and any of the outputs 198. In this polarization independent switch, optical signal loss is minimized to about 1 dB. These polarization independent switches, however, are somewhat more complex in operation than the polarized switches discussed above. This is because the input light must first be split, controlled and recombined at the same output fiber. The increased complexity of the optical signal routing requires a large number of addressable regions 190 in the FLC layer 188.

Figure 11:
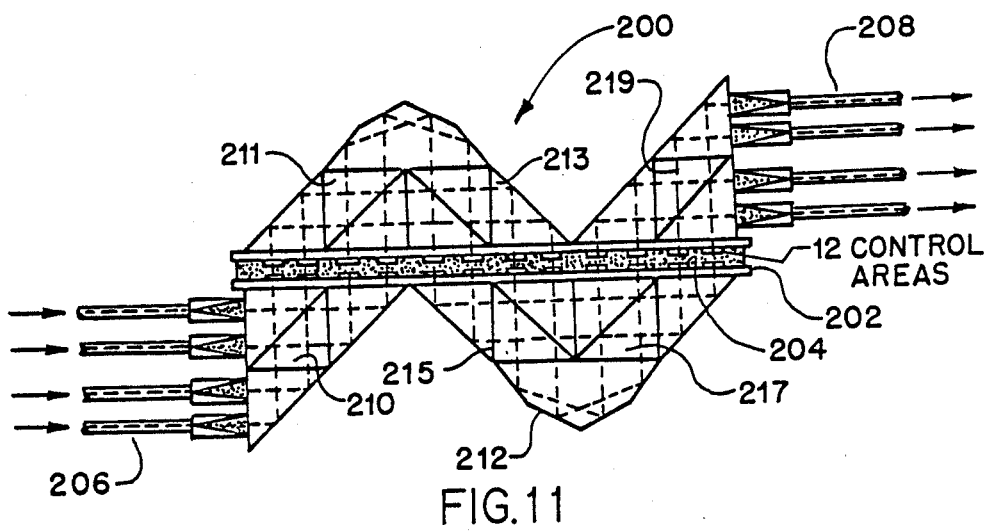
FIG. 11 is a schematic representation of a planer 4×4 optical matrix switch actuated by a single FLC layer with twelve addressable regions.

A similar polarization independent 4×4 optical matrix switch 200 is shown in FIG. 11 which can achieve all 24 possible switching configurations. The 4×4 switch 200 has a single FLC layer 202 with twelve addressable areas (pixels) 204. Switch 200 has four input fibers 206 which deliver light to an input polarizing beam splitter 210. This divides the light into its p and s polarized components and directs it though multiple passes of the ferroelectric crystal 204. This is done through use of multiple beam splitters 211, 213, 215, 217, and 219 as well as the internally reflective surfaces of the switch body 212. Thus, the individual components are controlled by the multiple addressable areas and are recombined in any of the output fibers 208. Operation of complex polarization independent switches can be more readily understood by examination a simpler switch in more detail, such a switch is shown in the drawing of FIG. 12.

Figure 12:
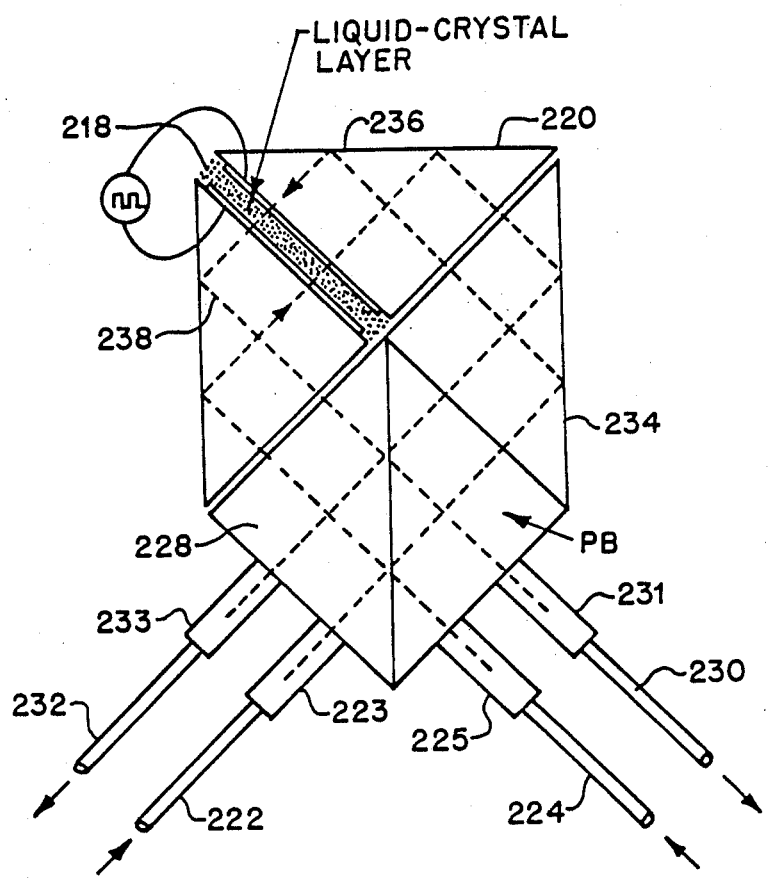
FIG. 12 is a schematic representation of a low cost design for a 2×2 optical switch utilizing a single polarizing beam splitter and a single FLC layer.

FIG. 12 is a schematic representation of a low cost design for a polarization independent 2×2 optical switch using a single polarizing beam splitter 228 and a single FLC layer 218. The 2×2 switch 220 has input fibers 222 and 224 with associated collimating lenses 223 and 225. It also has two output fibers 230 and 232 with associated focusing lenses 231 and 233.

An optical signal entering through input fiber 222 is divided by polarizing beam splitter 228 into s and p components, one of which (s) is transmitted through the polarizing beam splitter to internally reflective surface 234. This (s) component is directed to internal surface 236 and through the FLC layer 218 which in this case does not change the polarization state of the signal. The signal then reflected by internal surface 238 and transmitted back through the polarizing beam splitter and out into output fiber 230. The other polarization state (p) is reflected by the polarizing beam splitter upon entering through fiber 222. This reflected signal is subsequently reflected by internally reflective surface 238 sent through the ferroelectric crystal which does not change its polarization state. The p signal then is reflected by surfaces 236 and 234 and then for a second time by the polarizing beam splitter so that it is recombined with the rest of the optical signal in output fiber 230.

When the FLC 218 is energized to change polarization states, the input signal is initially transmitted through the polarizing beam splitter in one polarization state and reflected on its second pass therethrough. This results in the light being divided and then recombined in output fiber 232. Thus, in operation of this switch, any input signal from either of the input optic fibers can be directed in its entirety to either of the output optic fibers with low optical signal loss. This is a simple but effective polarization independent optical switch design.

Figure 13:
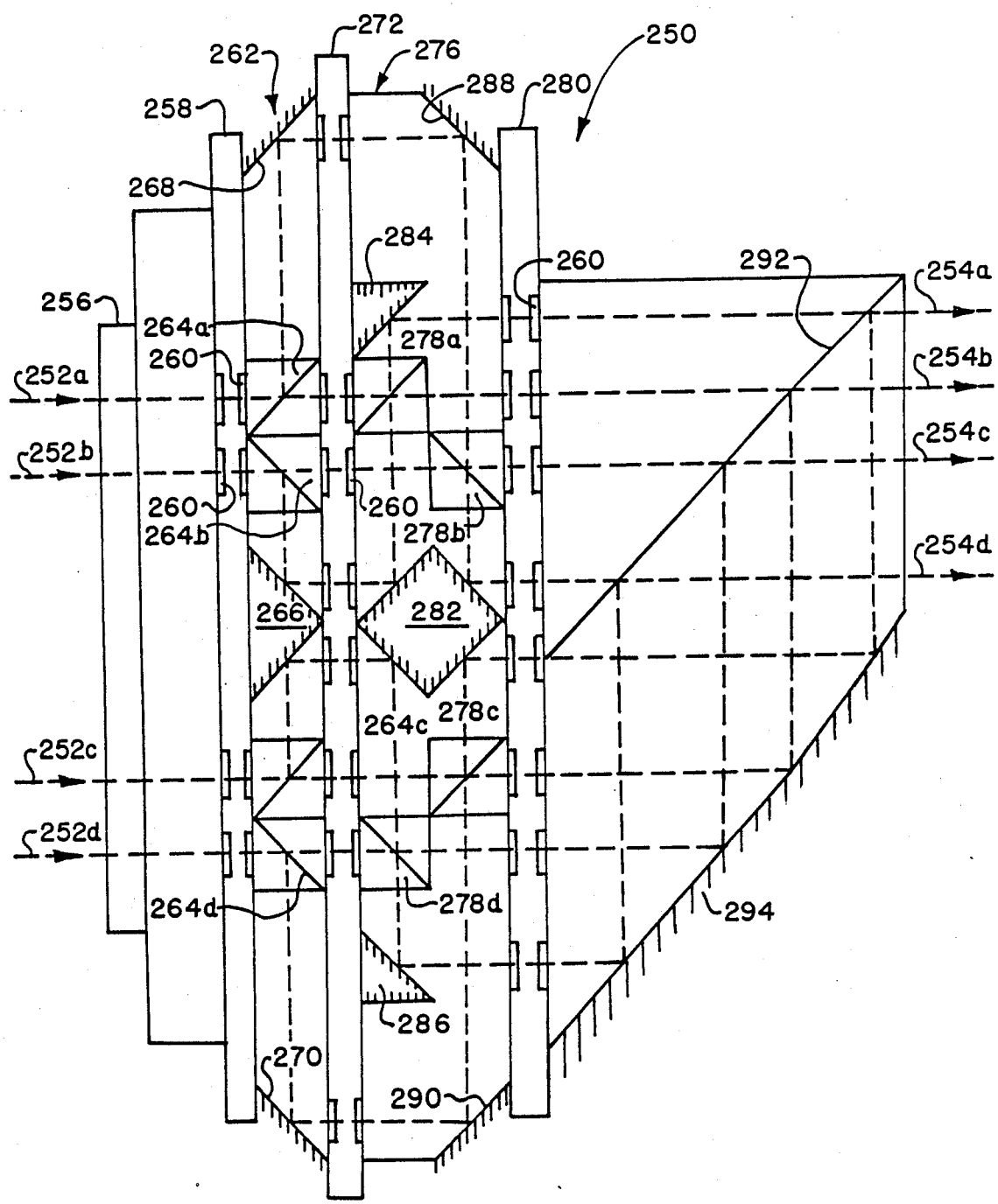
FIG. 13 is a schematic representation of a non-blocking 4×4 optical switch utilizing three FLC layers.

FIG. 13 is a schematic representation of a 4×4 nonblocking switch in which any input can be directed to any output. The switch 250 has four inputs 252a, 252b, 252c and 252d which utilizing a perfect shuffle, can have their signals directed to any of the four output paths 254a, 254b, 254c or 254d. Switch 250 is a polarized switch that makes use of a polarizer 256 to polarize input optical signals from input paths 252. Light is then directed to a first ferroelectric crystal 258 having four addressable pixels 260. Light passing through first ferroelectric crystal layer 258 then enters a first light directing layer 262.

Light directing layer 262 comprises four polarizing beam splitters 264a through 264d a dual right hand reflecting mirror or prism 266 and internally reflected surfaces 268 and 270. These direct optical signals from the input optical paths 252 according to their polarization state after they pass through the ferroelectric liquid crystal 258. Note that in the schematic, mirrors are designated with cross hatching directly under the reflective surface in order to discriminate them from polarizing beam splitters. For example, light impinging upon polarizing beam splitter 264a either passes directly through into second ferroelectric crystal 272 or is reflected towards internally reflective surface 268 depending upon its polarization state. An optical signal originating at input path 252b is either transmitted or reflected at polarizing beam splitter 264b according to its polarization state as determined by pixel 260 of ferroelectric crystal 258 and then passes directly through ferroelectric crystal (FLC) 272 or is reflected to right angle prism 266 and sent through a different pixel of FLC 272. The optical signals are then manipulated by the pixels 260 of FLC 272 and directed into second light directing layer 276.

Light directing layer 276 is comprised of four polarizing beam splitters 278a through d. These polarizing beam splitters are used to direct signals transmitted through ferroelectric crystal 272. Light is either transmitted to third FLC 280 or reflected to one of the several right angle reflecting surfaces found in light directing layer 276. The right angle light directing surfaces of layer 276 include a right angle reflecting cube 282, right angle prisms 284 and 286 as well as internally reflective surfaces 288 and 290. These light directing surfaces direct the optical signals to one of the eight pixels 260 of FLC layer 280. The uppermost four pixels 260 of layer 280 are used to correct the polarization of optical signals passing there through so they will pass through a final polarizing beam splitter 292. The bottom four pixels of layer 280 are also used to correct the polarization of optical signals passing there through so they will be reflected by the polarizing beam splitter and directed into optical paths 254. Signals from the lower pixels are initially reflected by an internal reflective surface 294 and then by the polarizing beam splitter 292. In this way, signals passing through any of the eight pixels 260 of FLC layer 280 are directed into any of the four optical output paths 254.

Switch 250 in its operational form would make use of the elements discussed in reference to the sWitch 10 of FIG. 1 but which have been removed herein for clarity. For example, each of the pixels 260 is connected to electrodes and a voltage source in order to control the optical rotary power of the pixel. Further, input paths are most likely optical fibers with grinrod collimating lenses as shown in FIG. 1 and output paths would comprise optical fibers having focusing lenses. Switches such as switch 250 are particularly useful in optical networks for directing optical signals onto preselected transmission paths. Such switches can be aligned according to optical polarization such that only the first switch in such a network would require a polarizer that reduces signal intensity.

FIG. 14 is a series of views of an optical bypass switch that would be particularly useful in a fiber optic network as a by-passable optical repeater The switch 300 is a dual plane device that utilizes a dual right angle prism 302 to transfer optical signals between the optical planes.

Specifically, switch 300 has a primary optical input 304 which takes the form of an optical fiber 305 and a grinrod lens 306. A primary output optical path 308 is also supplied with an optical fiber 309 and a focusing lense 310. A secondary output 312 for the optical repeater and a secondary input 314 also comprise fibers and lenses and are found at the base of the switch. Optical signals entering the switch at primary input 304 can either be directly rooted to primary output 308 (in a so-called bypass) or can be sent through a repeater or amplifier attached to output 312 and 314. The amplified signal is returned to the switch at secondary input 314 and directed to primary output 308.

Figure 14A:
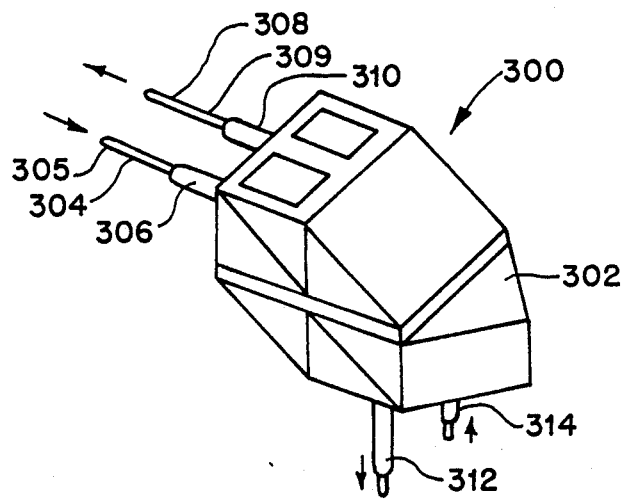
FIGS. 14A through 14E are perspective and isometric views of a dual plane 2×2 bypass switch.
Figure 14B:
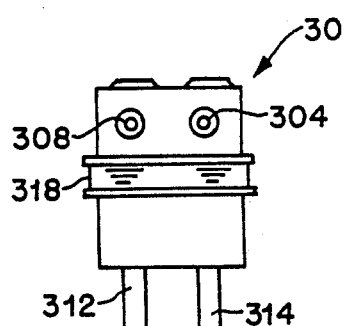
Figure 14C:
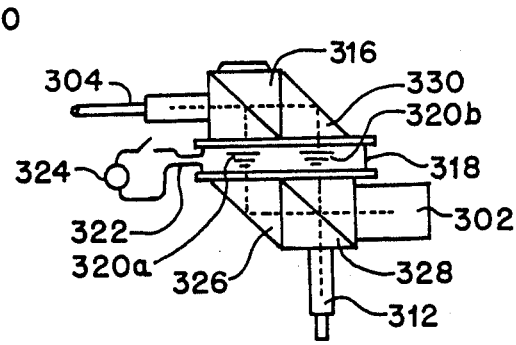
Figure 14D:
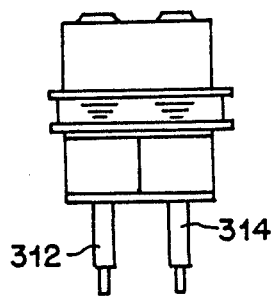
Figure 14E:
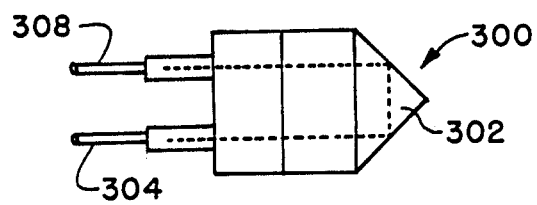

Turning now to FIGS. 14C and 14E, it is possible to understand the routing of optical signals through switch 300. An optical signal entering through input 304 is divided according to its polarization state by polarizing beam splitter 316. Light reflected by the polarizing beam splitter is then sent through ferroelectric crystal 318 having addressable pixels 320. These pixels are connected by electrodes 322 to a voltage source 324 in order to control their rotary optical power. If left unchanged optical signals passing through pixel 320a are reflected by internally reflective surface 326 into second polarizing beam splitter 328 which sends them out output path 312. The other half of the optical signal that entered through input 304 is transmitted through polarizing beam splitter 316 and reflected by internal reflective surface 330. This passes through ferroelectric liquid crystal pixel 320B and if left unchanged, rejoins the other half of the input optical signal by being transmitted through polarizing beam splitter 328 and also travelling out through output path 312. In such an arrangement, the switch acts to transfer the signal to the optical repeater and reversal of the paths sends signals from secondary input 314 back through primary output 308. In the alternative, if the FLC is used to adjust the polarization of the optical signal, the optical repeater (the secondary input and output) can be bypassed. In this case, an optical signal entering through input 304 is once again divided by the polarizing beam splitter 316. The pixels 320 are energized to rotate the optical signal to its opposite polarization. Therefore, a signal being reflected by polarizing beam splitter 316 will pass through the FLC and be reflected by internal reflective surface 326. The signal having had its polarization state changed by the FLC will then be transmitted through polarizing beam splitter 328 and into dual right angle prism 302. This can be more readily seen by referring to figure 14E. The dual right angle prism acts to transfer the optical signal from the right switch plane to the left switch plane of this dual plane switch. The signal will then travel back through the polarizing beam splitter 328 and the FLC to exit at primary output 308 without ever having been routed through the secondary input and output 312, 314. It can be easily understood how the other half of the optical signal is also so routed and rejoined at output path 308. Bypass switches of this type are most useful in optical networks similar to electrical communication networks. The switch 300 of FIG. 14 can be considered a pair of 1×2 switches that have been set in parallel to become a parallel plane switch which utilizes a right angle prism, set perpendicular to the switch planes, to transfer signals between the planes. This makes for a compact optical bypass switch design that can be readily manufactured and is simple to operate. In basic operation, both optical pixels can be run in unison. Further, this optical switch is an unpolarized device with very low optical loss since both polarization states of the optical signal are utilized and routed to the same outputs.

We have therefore shown how we can use optical cascades of polarizing beam splitters and ferroelectric liquid crystals to provide a multitude of optical switches for communications and other optical signal processing uses.

Complex paths including multiple forward/backward passes through ferroelectric liquid crystal layers are used. The FLC panels are divided up into novel individually addressable areas (pixels) and a specific tilt angle is used for 0 degrees to 90 degree rotation Further, polarizing beam splitters are extended in the lateral direction in a novel manner. These compound switching structures are particularly useful for low cross-talk switching applications. In some of the stacking arrangements multiple switches share a single ferroelectric liquid crystal layer for multiple optical paths. In all of the above switches, smectic FLCs are used because they have three orders of magnitude faster operating speeds than conventional twisted nematic switches Smectic liquid crystal layers can also be constructed to about one-half the thickness of nematic switches (i.e., about 1-2 microns) to allow the desired optical phase retardation for half-wave plate action. This permits the construction of more compact switches.

Finally, this invention gives a cost effective microsecond, high performance N×N switch design for use in optical processing.

While the invention has been described with reference to the preferred embodiments thereof, it will be understood by those skilled in the art that various changes in substance and form can be made therein without departing from the spirit and scope of the invention as described in the appended claims.

What is claimed is:

1. An optical switch comprising:
   four light input paths for receiving optical signals and four light output paths for transmitting the optical signals;
   a first liquid crystal cell comprising four addressable pixels for selectively changing optical signal polarization;
   a first light directing layer comprising polarizing beam splitters and right angle mirrors for directing optical signals according to their polarization;
   a second liquid crystal cell comprising eight addressable pixels for selectively changing optical signal polarization;
   a second light directing layer comprising polarizing beam splitters and right angle mirrors for directing optical signals according to their polarization;
   a third liquid crystal cell comprising eight addressable regions for selectively changing optical signal polarization; and
   a final light directing region comprising a polarizing beam splitter and a right angle mirror for directing the optical signals according to their polarization into any of four light output paths irrespective of which of said four light input paths originally received the optical signals.

2. The optical switch of claim 1 wherein the liquid crystal comprises a ferroelectric liquid crystal.

3. The optical switch of claim 2 wherein the ferroelectric crystal comprises electrodes for changing the optical rotary power of the crystal pixels.

4. The optical switch of claim 3 wherein said ferroelectric crystal pixels selectively rotate polarized light between s and p states.

5. The optical switch of claim 1 further comprising a polarizer for polarizing light received into said optical switch.

6. The optical switch of claim 5 wherein said first light directing layer comprises four polarizing beam splitters.

7. The optical switch of claim 6 wherein said second light directing layer comprises four polarizing beam splitters.

8. An optical switch comprising:
   (a) a first switch plane comprising:
      (i) an input fiber for receiving an optical signal,
      (ii) a first polarizing beam splitter for directing optical signals according to their polarization,
      (iii) a ferroelectric liquid crystal pixel for selectively rotating polarized light in optical signals between s and p states,
      (iv) a second polarizing beam splitter for directing optical signals according to their polarization, and
      (v) an output fiber for transmitting an optical signal;
   (b) a second switch plane, oriented parallel to said first switch plane, comprising:
      (i) an input fiber for receiving an optical signal,
      (ii) a first polarizing beam splitter for directing optical signals according to their polarization,
      (iii) a ferroelectric liquid crystal pixel for selectively rotating polarized light in optical signals between s and p states,
      (iv) a second polarizing beam splitter for directing optical signals according to their polarization, and
      (v) an output fiber for transmitting an optical signal; and
   (c) a dual right angle prism oriented perpendicular to said switch planes for transferring optical signals between said switch planes.

9. The optical switch of claim 8 wherein the ferroelectric crystal pixel comprises electrodes for changing the optical rotary power of the crystal.

10. The optical switch of claim 9 wherein said input fibers further comprises a collimating lens for collimating light directed into said switch.

11. The fiber optic switch of claim 1 wherein said output fibers further comprises a lens for focusing collimated light from said switch onto the core of the output fiber.

* * * * *